United States Patent [19]

Freitag et al.

[11] 4,081,495

[45] Mar. 28, 1978

[54] THERMOPLASTIC MOULDING COMPOSITIONS AND MOULDINGS OF POLYCARBONATES, WITH IMPROVED EASE OF MOULD RELEASE WHEN INJECTION-MOULDED

[75] Inventors: Dieter Freitag; Werner Nouvertné, both of Krefeld; Frank Kleiner, Cologne, all of Germany

[73] Assignee: Bayer Aktiengesellschaft, Leverkusen, Germany

[21] Appl. No.: 710,070

[22] Filed: Jul. 30, 1976

[30] Foreign Application Priority Data

May 7, 1976 Germany ............... 2620255

[51] Int. Cl.$^2$ ............ C08L 67/00; C08K 5/01; C08K 5/02
[52] U.S. Cl. ............... 260/860; 260/33.6 R; 260/33.8 R; 260/40 R; 264/130; 264/331; 264/338
[58] Field of Search .......... 260/860, 33.6 R, 33.8 R; 264/130, 331, 338

[56] References Cited

U.S. PATENT DOCUMENTS

| | | | |
|---|---|---|---|
| 2,789,964 | 4/1957 | Reynolds et al. | 260/47 |
| 3,290,409 | 12/1966 | Munro | 260/860 |
| 3,475,373 | 10/1969 | Jackson, Jr. et al. | 260/47 |
| 3,890,266 | 6/1975 | Serini et al. | 260/860 X |

FOREIGN PATENT DOCUMENTS

| | | |
|---|---|---|
| 702,625 | 1/1965 | Canada ............... 260/860 |
| 34992/76 | 3/1976 | Japan. |

Primary Examiner—Thomas De Benedictis, Sr.
Attorney, Agent, or Firm—Gene Harsh; Lawrence S. Pope; Frederick H. Colen

[57] ABSTRACT

The invention relates to a thermoplastic moulding composition comprising an aromatic high-molecular weight polycarbonate based on a diphenol, with a weight-average molecular weight ($\overline{M}_w$) of at least 10,000 and from 0.5 to 5% by weight, relative to the high molecular weight polycarbonate, of a polycarbonate which has an $\overline{M}_w$ of from 1,200 to 9,000 and which corresponds to the formula (I):

$$E-CO-[O-Z-O-\underset{\underset{O}{\|}}{C}-]_n-E \qquad (I)$$

wherein

"E" represents a radical of the formula (II):

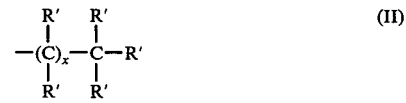

in which the groups R' are identical and denote H or halogen
$x$ is an integer of from 7 to 24
"Z" is a divalent aromatic radical, and
"n", the degree of polymerization, results from the $\overline{M}_w$ between 1,200 and 9,000.

5 Claims, 1 Drawing Figure

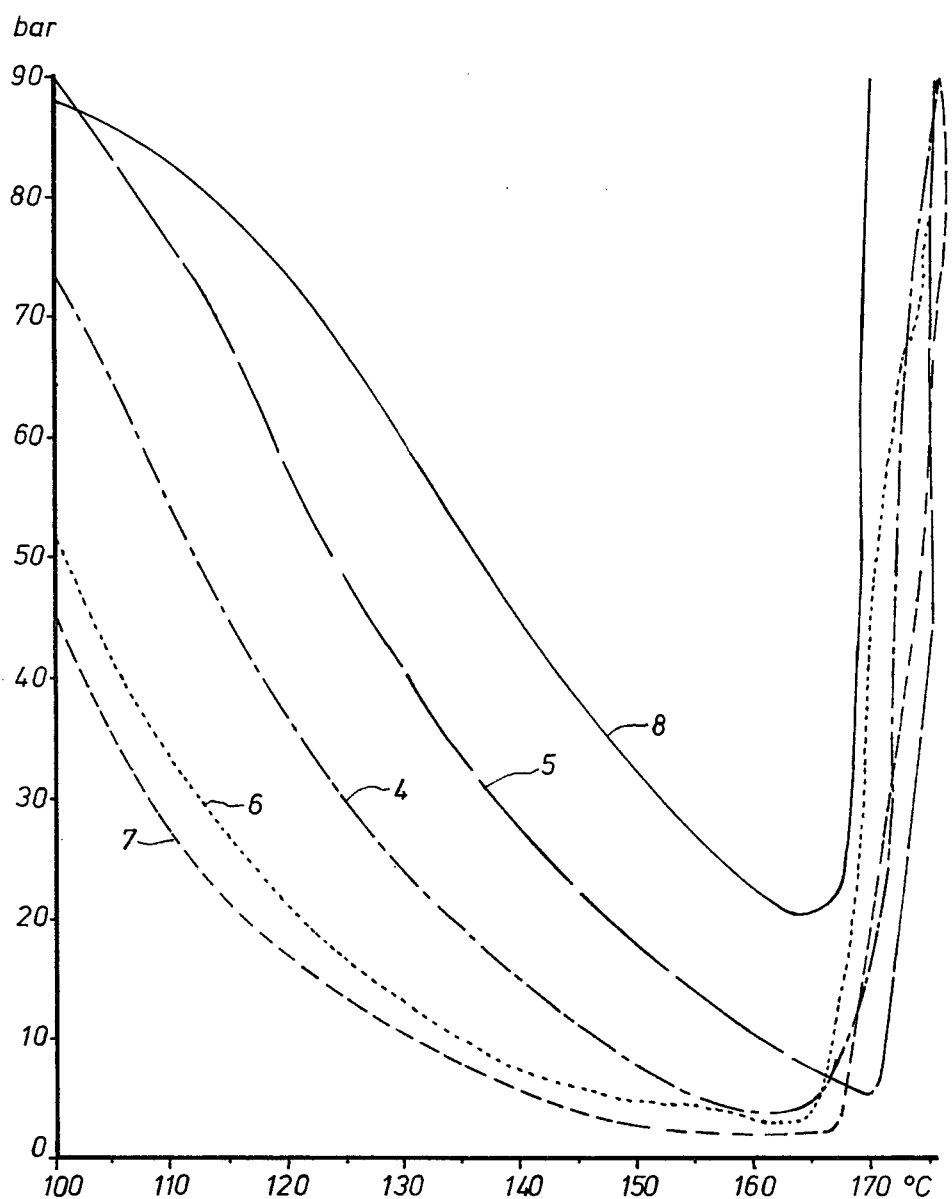

THERMOPLASTIC MOULDING COMPOSITIONS AND MOULDINGS OF POLYCARBONATES, WITH IMPROVED EASE OF MOULD RELEASE WHEN INJECTION-MOULDED

SUMMARY OF THE INVENTION

The present invention relates to thermoplastic moulding compositions which contain aromatic high-molecular weight polycarbonates based on diphenols, with molecular weights $\overline{M}w$ (weight-average) of at least 10,000, and which are characterised in that they contain, in amounts of between 0.5 and 5% by weight, relative to the high-molecular weight polycarbonates, polycarbonates with molecular weights $\overline{M}w$ (weight-average) of between 1,200 and 9,000, which correspond to the following structural formula I

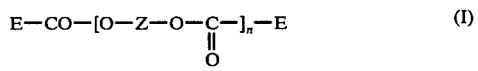

wherein
the end groups "E" correspond to the formula II,
"Z" is a divalent aromatic radical from the formula III, which preferably contains 6 to 30 C atoms,
and wherein
"n" is the degree of polymerisation which results from the $\overline{M}w$ of from 1,200 to 9,000.

The end groups "E" of the formula II have the following structure

wherein
the R' are identical and denote H or halogen, for example fluorine, chlorine and bromine, and
x is an integer of from 7 to 24.

The divalent aromatic radical "Z" results from the diphenols of the formula III

and preferably contains 6 to 30 C atoms, can be either mononuclear or polynuclear, can contain hetero-atoms and can be substituted.

In comparison to the usual polycarbonates, the thermoplastic moulding compositions according to the invention exhibit substantially improved ease of mould release. This improvement in the ease of mould release, brought about by the addition of small amounts of special polycarbonates of the formula I, is surprising since it is known that in the special polycarbonates of the formula I, because of the coiled-up structure of polymers, the end groups are largely screened.

As compared to the ease of mould release of polycarbonate achieved by low-molecular weight additives (compare German Patent Specification 2,064,095 [Le A 13 461], DT-OS (German Published Specification) 2,220,185 [Le A 14 329] and German Patent Applications P 2,506,726 [Le A 16 235] and P 2,507,748 [Le A 16 248]), additions of polycarbonates of the formula I in polycarbonate mouldings permit higher use temperatures and thus permit the advantageous use of the polycarbonate moulding compositions according to the invention in, for example, the electrical field.

DETAILED DESCRIPTION OF THE INVENTION

By aromatic high-molecular weight polycarbonates in the sense of the present invention there are understood homopolycarbonates and copolycarbonates which are based, for example, on one or more of the following diphenols: hydroquinone, resorcinol, dihydroxydiphenyls, bis-(hydroxyphenyl)-alkanes, bis-(hydroxyphenyl)-cycloalkanes, bis-(hydroxyphenyl)-sulphides, bis-(hydroxyphenyl)-ethers, bis-(hydroxyphenyl)-ketones, bis-(hydroxyphenyl)-sulphoxides, bis-(hydroxyphenyl)-sulphones and α,α-bis-(hydroxyphenyl)-diisopropylbenzenes, as well as their nuclear-alkylated and nuclear-halogenated compounds. These and further suitable diphenols are described, for example, in U.S. Pat. Nos. 3,028,365, 2,999,835, 3,148,172, 3,271,368, 2,991,273, 3,271,367, 3,280,078, 3,014,891 and 2,999,846, in German Offenlegungschriften (German Published Specifications) 1,570,703, 2,063,050, 2,063,052, 2,211,956 and 2,211,957, in French godfather's letter 1,561,518 and in the monograph "H. Schnell, Chemistry and Physics of Polycarbonates, Interscience Publishers, New York, 1964".

Examples of preferred diphenols are: 4,4'-dihydroxydiphenyl, 2,2-bis-(4-hydroxyphenyl)-propane, 2,4-bis-(4-hydroxyphenyl)-2-methylbutane, 1,1-bis-(4-hydroxyphenyl)-cyclohexane, α,α'-bis-(4-hydroxyphenyl)-p-diisopropylbenzene, 2,2-bis-(3-methyl-4-hydroxyphenyl)-propane, 2,2-bis-(3-chloro-4-hydroxyphenyl)-propane, bis-(3,5-dimethyl-4-hydroxyphenyl)-methane, 2,2-bis-(3,5-dimethyl-4-hydroxyphenyl)-propane, bis-(3,5-dimethyl-4-hydroxyphenyl)-sulphone, 2,4-bis-(3,5-dimethyl-4-hydroxyphenyl)-2-methylbutane, 1,1-bis-(3,5-dimethyl-4-hydroxyphenyl)-cyclohexane, α,α-bis-(3,5-dimethyl-4-hydroxyphenyl)-p-diisopropylbenzene, 2,2-bis-(3,5-dichloro-4-hydroxyphenyl)-propane and 2,2-bis-(3,5-dibromo-4-hydroxyphenyl)-propane.

Examples of particularly preferred diphenols are: 2,2-bis-(4-hydroxyphenyl)-propane, 2,2-bis-(3,5-dimethyl-4-hydroxyphenyl)-propane, 2,2-bis-(3,5-dichloro-4-hydroxyphenyl)-propane, 2,2-bis-(3,5-dibromo-4-hydroxyphenyl)-propane and 1,1-bis-(4-hydroxyphenyl)-cyclohexane.

The aromatic high-molecular weight polycarbonates can be prepared in accordance with known processes, such as, for example, in accordance with the melt transesterification process from bisphenol and diphenyl carbonate, and in accordance with the two-phase boundary process from bisphenols and phosgene, as described in the abovementioned literature, in particular according to H. Schnell "Chemistry and Physics of Polycarbonates", Polymer Reviews, Vol. IX, pages 27 et seq., Interscience Publishers, New York, 1964.

The aromatic high-molecular polycarbonates can be branched as a result of the incorporation of small amounts, preferably amounts of between 0.05 and 2.0 mol % (relative to diphenols employed), of trifunctional or more than trifunctional compounds, especially compounds with three or more phenolic hydroxyl groups.

Polycarbonates of this type are described, for example, in German Offenlegungsschriften (German Published Specifications) 1,570,533, 1,595,762, 2,116,974 and 2,113,347, British Patent Specification 1,079,821, U.S. Pat. No. 3,544,514 and German Patent Application P 25 00 092.4 (Le A 16 142).

Some examples of the compounds with three or more than three phenolic hydroxyl groups which can be used are phloroglucinol, 4,6-dimethyl-2,4,6-tri-(4-hydroxyphenyl)-hept-2ene, 4,6-dimethyl-2,4,6-tri-(4-hydroxyphenyl)-heptane, 1,3,5-tri-(4-hydroxyphenyl)-benzene, 1,1,1-tri-(4-hydroxyphenyl)-ethane, tri-(4-hydroxyphenyl)-phenylmethane, 2,2-bis-[4,4-bis-(4-hydroxyphenyl)-cyclohexyl]-propane, 2,4-bis-(4-hydroxyphenylisopropyl)-phenol, 2,6-bis-(2'-hydroxy-5'-methyl-benzyl)-4-methylphenol, 2-(4-hydroxyphenyl)-2-(2,4-dihydroxyphenyl)-propane, hexa-(4-(4-hydroxyphenylisopropyl)phenyl) orthoterephthalic acid ester, tetra-(4-hydroxyphenyl)-methane, tetra-(4-(4-hydroxyphenylisopropyl)-phenoxy)-methane and 1,4-bis-((4',4''-dihydroxytriphenyl)-methyl)-benzene. Some of the other trifunctional compounds are 2,4-dihydroxybenzoic acid, trimesic acid, cyanuric chloride and 3,3-bis-(4-hydroxyphenyl)-2-oxo-2,3-dihydroindole.

The aromatic high-molecular polycarbonates should as a rule have mean weight-average molecular weights $\overline{M}_w$ of at least 10,000, especially of 10,000 to 200,000, preferably of 20,000 to 80,000, determined by measuring the relative viscosity in $CH_2Cl_2$ at 25° C and a concentration of 0.5% by weight.

Suitable diphenols of the formula III

which preferably can contain 6 to 30 C atoms and which can be mononuclear and polynuclear, can contain hetero-atoms and can be substituted, for the preparation of the polycarbonates of the formula I, are again those listed above.

The polycarbonates of the general formula I are prepared in accordance with the following 2 processes:

a. In accordance with the solution process in a disperse phase (the so-called two-phase boundary process).

In this, the diphenols of the formula III are dissolved in an aqueous alkaline phase. 25-125 mol %, relative to one mol of diphenol III, of a compound of the general formula IIa

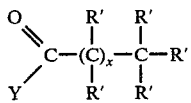

wherein
the R' are identical and denote H or halogen, for example fluorine, chlorine and bromine and
$y$ is OH or halogen, for example chlorine or bromine and
$x$ is a integer of from 7 to 24, are added thereto, in a concentrated form or as a solution in an organic solvent. A reaction with phosgene is then carried out in the presence of an inert organic phase which preferably dissolves polycarbonate. The reaction temperature is between about 0° C and 40° C. The compounds of the general formula IIa, of the type and in the amount stated above, can also be added during the phosgenation. Suitable organic solvents for the compounds of the formula IIa are, for example, methylene chloride, chlorobenzene, mixtures of methylene chloride and chlorobenzene, acetone and acetonitrile.

The reaction can be assisted by catalysts such as, for example, tributylamine or triethylamine.

b. By the solution process in a homogeneous phase (the so-called pyridine process):

In this, the diphenols of the formula III are dissolved in organic bases, such as pyridine, if appropriate with the addition of further organic solvents; 25-125 mol %, relative to one mol of diphenol III, of a compound of the general formula IIa are then added at room temperature, as described under a). A reaction with phosgene is then carried out. The reaction temperature is between 0° C and 40° C. Suitable solvents are, for example, methylene chloride, chlorobenzene and mixtures of methylene chloride and chlorobenzene.

In both process variants a) and b), the polycarbonates of the formula I are isolated in a known manner.

The polycarbonates of the formula I which favour mould release as a rule have molecular weights $\overline{M}_w$ (weight-average) of 1,200–9,000, determined by gel chromatography after prior calibration.

Compounds of the formula IIa which are suitable according to the invention are all n-$C_9$-$C_{26}$-carboxylic acids, their halogenation products and their acid halides, that is to say, for example, perfluorononanoic acid, capric acid, myristic acid, palmitic acid, stearic acid, cerotic acid and the corresponding acid chlorides and acid bromides.

The chain stoppers of the formula IIa can be employed either individually, or several at a time, for the preparation of the polycarbonates of the formula I.

To produce the thermoplastic moulding compositions according to the invention, which are easily releasable from the mould, the polycarbonates of the formula I, which are normally in the form of a powder, are applied by tumbling, in amounts of 0.5–5% by weight, relative to high-molecular polycarbonate, onto the granules of the high-molecular polycarbonate and the material is then extruded on an extruder at about 280° C to give a strand, and is again granulated. The additive has no noticeable adverse effect on either the transparency or the colour. Furthermore, dyestuffs, pigments, UV stabilisers and heat stabilisers, or glass fibres can also be added to the polycarbonate without impairing the effectiveness of the mould release agent. The incorporation of the polycarbonates of the formula I, which act as mould release agents, in amounts of 0.5–5% by weight, can also be carried out during the preparation of the high-molecular polycarbonate. In that case the mould release agent according to the invention is dissolved in a solvent, such as, for example, methylene chloride or methylene chloride/chlorobenzene, and is metered in prior to the devolatilisation to remove the solvent which is used during the preparation of the high-molecular weight polycarbonate.

EXAMPLES

A. Preparation of polycarbonates of the formula I (mould release agents)

EXAMPLE 1

A solution is prepared from 91.2 g (0.4 g) of 2,2-bis-(4-hydroxyphenyl)-propane (bisphenol A), 400 g (2.0 mols) of a 20% strength aqueous sodium hydroxide solution and 785 ml of distilled water. After adding 700 ml of methylene chloride, 151.5 g (0.5 mol) of stearic acid chloride, dissolved in 200 ml of methylene chloride, are added dropwise in the course of 15 minutes at room temperature, whilst stirring. 49.5 g (0.5 mol) of phosgene are then passed in at 20°–25° C, thereafter 0.58 ml of triethylamine are added and the mixture is stirred for a further 30 minutes. The organic phase is separated off, acidified, washed free from electrolyte and evaporated. About 200 g of a colourless product of melting point 54°-58° C are obtained.

$\overline{M}_w$ 1,280 (determined by gel chromatography after prior calibration)

$\overline{M}_n$ 1,090 (determined by gel chromatography after prior calibration)

EXAMPLE 2

456 g (2 mols) of bisphenol A are dissolved in 8.25 kg (16.5 mols) of 8% strength sodium hydroxide solution. 3.5 l of methylene chloride are added thereto, and 151.5 g (0.5 mol) of stearic acid chloride, dissolved in one litre of methylene chloride, are added dropwise in the course of 20 minutes at room temperature, whilst stirring. 445.5 g (4.5 mols) of phosgene are then passed in over the course of 20 minutes at 18°-24° C and pH 13. 2.9 ml of triethylamine are then added and the mixture is stirred for a further hour. After separating off the organic phase, the latter is acidified, washed free from electrolyte and evaporated. A colourless powder of melting point >200° C is obtained.

$\overline{M}_w$ 7,500 (determined by gel chromatography after prior calibration)

$\overline{M}_n$ 3,400 (determined by gel chromatography after prior calibration)

EXAMPLE 3

1,067.5 g (3.75 mols) of stearic acid are stirred into a stirred solution of 3,420 g (15 mols) of bisphenol A in 45 kg (90 mols) of 8% strength sodium hydroxide solution. After adding 40 litres of methylene chloride, 2,227.5 g (22.5 mols) of phosgene are passed in over the course of 90 minutes at 20°-28° C. 15.15 g of triethylamine are then added and the mixture is stirred for a further 60 minutes. After acidification, the organic phase is separated off and washed free from electrolyte. A colourless powder of melting point 218°-222° C is obtained.

$\overline{M}_w$ 4,980 (determined by gel chromatography after prior calibration)

$\overline{M}_n$ 2,400 (determined by gel chromatography after prior calibration)

B. Preparation of a high-molecular weight polycarbonate

EXAMPLE 8

About 456 parts of 4,4'-dihydroxydiphenyl-2,2-propane and 11.1 parts of p-tert.-butylphenol are suspended in 1.5 l of water. The oxygen is removed from the reaction mixture in a 3-necked flask equipped with a stirrer and gas inlet tube, by passing nitrogen through the reaction mixture for 15 minutes, whilst stirring. 365 parts of 45% strength sodium hydroxide solution and 1,000 parts of methylene chloride are then added. The mixture is cooled to 25° C. 237 parts of phosgene are added over a period of 120 minutes, whilst maintaining this temperature by cooling. An additional amount of 75 parts of a 45% strength sodium hydroxide solution is added after 15-30 minutes or after the absorption of phosgene has started. 1.6 parts of triethylamine are added to the resulting solution and the mixture is stirred for a further 15 minutes. A very viscous solution is obtained, the viscosity of which is regulated by adding methylene chloride. The aqueous phase is separated off. The organic phase is washed with water until free from salt and alkali. The polycarbonate is isolated from the washed solution and dried. The polycarbonate has a relative viscosity of about 1.28, measured in an 0.5% strength solution of methylene chloride at 20°. This corresponds approximately to a molecular weight of 28,000. The polycarbonate thus obtained is extruded and granulated.

C. Examples of the moulding compositions according to the invention:

| Example | Polycarbonate from Example 8 | Granules at 120° C were coated by tumbling with the following |
|---|---|---|
| 4 | 1.28 | 0.5% by weight of polycarbonate according to Example 1 |
| 5 | 1.28 | 0.5% by weight of polycarbonate according to Example 3 |
| 6 | 1.28 | 2% by weight of polycarbonate according to Example 1 |
| 7 | 1.28 | 5% by weight of polycarbonate according to Example 2 |

The attached figure shows the mould release behaviour of Examples 4 to 7 according to the invention and of the polycarbonate of Example 8. The mould release behaviour is read off in terms of the mould release pressure and is the better, at a given temperature, the lower is the mould release pressure required. The mould release pressure is measured as follows:

15 g of polycarbonate melt are injection-moulded onto a metal core of length and diameter each 35 mm. After cooling to a specified defined temperature, the force required to press the moulding off the metal core is measured.

D. Comparison of the heat resistance of a low-molecular weight mould release agent customary for polycarbonates (compare German Patent Specification 2,064,095) with the mould release agent of Example 3.

| Glyceride of palmitic acid, stearic acid and myristic acid | | Polycarbonate according to Example 3 | |
|---|---|---|---|
| Weight loss in % | ° C | Weight loss in % | ° C |
| 0.5 | 192 | 0.5 | 175 |
| 1.0 | 212 | 1.0 | 275 |
| 3.0 | 239 | 3.0 | 353 |
| 7.0 | 259 | 7.0 | 393 |

What we claim is:

1. A thermoplastic moulding composition comprising an aromatic high-moleculr weight polycarbonate based on a diphenol, with a weight-average molecular weight ($\overline{M}_w$) of at least 10,000 and from 0.5 to 5% by weight, relative to the high molecular weight polycarbonate, of a polycarbonate which has an $\overline{M}_w$ of from 1,200 to 9,000 and which corresponds to the formula (I):

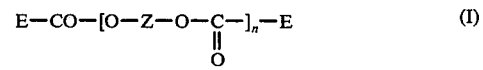

wherein

"E" represents a radical of the formula (II):

in which the groups R' are identical and denote H or halogen x is an integer of from 7 to 24

"Z" is a divalent aromatic radical, and

"n", the degree of polymerisation, results from the $\overline{M}_w$ between 1,200 and 9,000.

2. A composition according to claim 1 wherein the aromatic high molecular weight polycarbonate is based on hydroquinone, resorcinol, a dihydroxyphenyl, a bis-(hydroxyphenyl)-alkane, a bis-(hydroxyphenyl)-cycloalkane, a bis-(hydroxyphenyl)-sulphide, a bis-(hydroxyphenyl)-ether, a bis-(hydroxyphenyl)-ketone, a bis-(hydroxyphenyl)-sulphoxide, a bis-(hydroxyphenyl)-sulphone, an α,α'-bis-(hydroxyphenyl)-diisopropyl benzene, or a nuclear-alkylated or nuclear-halogenated derivative of any of the foregoing compounds.

3. A composition according to claim 1 wherein the aromatic high-molecular weight polycarbonate has an $\overline{M}_w$ of from 20,000 to 80,000.

4. A process for producing moulded articles which comprises injection moulding a composition according to claim 1.

5. A moulded article formed from a composition according to claim 1.

* * * * *